(12) United States Patent
Doering et al.

(10) Patent No.: US 7,831,805 B2
(45) Date of Patent: *Nov. 9, 2010

(54) COUPLING A GENERAL PURPOSE PROCESSOR TO AN APPLICATION SPECIFIC INSTRUCTION SET PROCESSOR

(75) Inventors: Andreas C. Doering, Adliswil (CH); Silvio Dragone, Adliswil (CH)

(73) Assignee: International Business Machines Corporation, Armonk, NY (US)

(*) Notice: Subject to any disclaimer, the term of this patent is extended or adjusted under 35 U.S.C. 154(b) by 404 days.

This patent is subject to a terminal disclaimer.

(21) Appl. No.: 11/926,090

(22) Filed: Oct. 28, 2007

(65) Prior Publication Data

US 2008/0098202 A1    Apr. 24, 2008

Related U.S. Application Data

(63) Continuation of application No. 11/035,934, filed on Jan. 14, 2005, now Pat. No. 7,293,159.

(30) Foreign Application Priority Data

Jan. 15, 2004    (EP) .................................. 04405030

(51) Int. Cl.
G06F 15/76    (2006.01)
(52) U.S. Cl. ........................................................ 712/34
(58) Field of Classification Search ................. 712/34
See application file for complete search history.

(56) References Cited

U.S. PATENT DOCUMENTS

| 4,841,476 | A  |   | 6/1989  | Mitchell et al. |
| 5,909,565 | A  | * | 6/1999  | Morikawa et al. ........... 712/200 |
| 5,923,892 | A  |   | 7/1999  | Levy |
| 6,671,793 | B1 | * | 12/2003 | Swaney et al. ................ 712/34 |
| 6,711,667 | B1 |   | 3/2004  | Ireton |
| 2001/0032305 | A1 |   | 10/2001 | Barry |
| 2002/0013892 | A1 | * | 1/2002  | Gorishek et al. ............ 712/227 |
| 2004/0168041 | A1 | * | 8/2004  | Shui et al. ..................... 712/34 |
| 2005/0027965 | A1 | * | 2/2005  | Yamada et al. ................ 712/34 |
| 2005/0055594 | A1 |   | 3/2005  | Doering et al. |

* cited by examiner

*Primary Examiner*—Jacob Petranek
(74) *Attorney, Agent, or Firm*—Cantor Colburn LLP; Vazken Alexanian

(57) ABSTRACT

Provides methods, systems and apparatus for coupling a general purpose processor (GPP) to an application specific instruction set processor (ASIP) in such a manner that the GPP can include execute instructions that do not normally comprise part of its instruction set architecture (ISA). The GPP is coupled to the ASIP via a coprocessor port such that instructions issued by the GPP to the port are conveyed to a novel pre-decoder module of the ASIP. The pre-decoder module translates the GPP instruction into operation codes for ASIP instructions to be executed in the ASIP or to an address in the ASIP instruction memory that identifies a start address for a plurality of ASIP instructions defining a complex application specific function. Once the ASIP has executed the instructions it shares the result of the execution with the GPP. In this way, the GPP takes advantage of the ASIP in its ability to more quickly execute an application specific program/procedure.

18 Claims, 9 Drawing Sheets

COUPLING A GENERAL PURPOSE PROCESSOR TO AN APPLICATION SPECIFIC INSTRUCTION SET PROCESSOR

CROSS REFERENCE TO RELATED APPLICATIONS

This application is a continuation of U.S. patent application Ser. No. 11/035,934, filed Jan. 14, 2005, now U.S. Pat. No. 7,293,159, which claims priority to European Patent Office Application 04405030 having a filing date of Jan. 15, 2004, and all the benefits accruing therefrom under 35 U.S.C. §119.

FIELD OF THE INVENTION

The present invention relates to a method of coupling a general purpose processor (GPP) and an application specific instruction set processor (ASIP). More particularly, but not exclusively, it relates to a method of coupling a GPP and an ASIP to share the results of execution of an ASIP instruction, and also relates to a resulting processor configuration.

BACKGROUND OF THE INVENTION

Until the 1990's, most computers utilized traditional general purpose processors (GPPs) to execute applications. In GPP architecture, primitive, low-level instructions (operations) such as add, multiply, subtract, compare, load, store for example, are implemented in simple hardware execution units, and often referred to as Arithmetic Logic Units (ALUs). These can be sequenced into a programmed set of instructions (software program) to implement a complex function. Such architecture is limited in its performance by the throughput achievable by the execution units of the GPP and the number of available operations of said units. Thus, for a complex function, several instructions are required to execute it if the number of available low-level instructions is low such as in a Reduced Instruction Set Computer (RISC), for example. Such a limitation places a great demand on the hardware and results in inefficiencies in the utilisation of the hardware. In addition, power management of such a centrally controlled architecture can be difficult. However, through the medium of software, such processors are very flexible in the applications they can execute and their general applicability renders them low cost, relatively speaking.

One solution to the performance problem associated with GPPs is the provision of hardware dedicated to execution of a specific, complex function. In general, two technology approaches have been developed to allow IC designers to develop application specific integrated circuits (ASICs). These are the "standard cell" and "gate array" technologies. In the standard cell approach, logic blocks are interconnected to provide desired functions. Typically, these blocks are primitive logic structures such as NAND or NOR gates or other simple logic blocks such as "adder" or "multiplier". Gate array technology involves the fabrication of a large number of base wafers including identical IC elements (gates). An ASIC is formed by customising the gate array through specifying the conductive patterns to interconnect the pre-fabricated gates.

ASICs have greatly improved processing speed compared to GPPs. However, there are a number of problems associated with using standard cell or gate array technology to design ASICs which perform complicated functions. For example, since the standard cells and gate arrays are primitive or simple logic blocks for all types of applications, it takes great effort and skill to integrate these building blocks into useful ASICS. Whilst this problem has to some degree been mitigated by automated logic block layout processes, the resultant ASICs are still inflexible in their applicability. Consequently, ASICs, whilst ideal for executing specific applications, are inflexible having regard to execution of other functions and are expensive to develop compared to GPPs.

In more recent times, there has been a desire to find a middle way between the extremes of the low cost, high flexibility GPPs and the high cost, low flexibility ASICs. Other pressures such as time to market have also been motivating factors to find a new approach.

One such middle way comprises a system-on-chip (SoC) processor. In SoC design, the goal is to integrate an entire computing system on a single microchip. A SoC is constructed from pre-designed and reusable intellectual property (IP) blocks. An IP block may comprise a silicon layout of a multiplier unit, for example. The SoC system designer combines and possibly alters the IP blocks to deliver a SoC that matches a desired specification. A SoC may be any kind of static or programmable microchip.

An alternative approach is to try and take a GPP architecture and improve its performance by moving often executed instruction sequences (functions) into special hardware execution units requiring only one instruction to implement such a function. The result is an application specific instruction set processor (ASIP) which is designed to perform certain specific tasks as efficiently as possible. An ASIP sits between the high efficiency of an ASIC and the low cost of a GPP and provides a good balance of hardware and software to meet requirements such as flexibility, performance, fast time to market and power consumption. Because ASIPs are targeted mainly at embedded applications, processor simplicity is a major goal. In a typical ASIP design flow, the application software is profiled at assembler language level to detect instruction sequences (functions) that occur often and could be implemented in separate hardware execution units to improve performance.

Processor architectures for computer systems are known which comprise a GPP coupled to one or more ASIPs via a common bus. The GPP comprises a Central Processing Unit (CPU) of the system which executes a main control program of the system, whereas the ASIP executes an application specific program responsive to the CPU (GPP). Thus, logically, execution of an application is split into a data path part performed by the ASIP and a control part performed by the GPP. However, this split between these two domains may not always be so straight forward depending on the requirements of the application being executed. Situations may arise where an application specific instruction executed by an ASIP comprises a function which is also employed by the GPP.

SUMMARY OF THE INVENTION

It is an object of the invention to obviate and/or mitigate disadvantages associated with known arrangements of GPPs and ASIPs. It is a further object of the invention to provide a coupled GPP and ASIP which share the results of execution of an ASIP instruction.

According to a first aspect of the invention, there is provided a method of operating a general purpose processor (GPP) coupled via a port of the GPP to an application specific data path of an application specific instruction set processor (ASIP), characterized in that it comprises the steps of: conveying a GPP instruction to a pre-decoder of the ASIP via the GPP port; in the pre-decoder, translating the received GPP instruction to a form compatible with an instruction set architecture (ISA) of the ASIP; executing in the ASIP one or more ASIP compatible instructions resulting from the translation step; and conveying a result of the execution step to the GPP.

According to a second aspect of the invention, there is provided a processor arrangement comprising a general purpose processor (GPP) coupled to an application specific instruction set processor (ASIP), the arrangement being characterized in that: the GPP is coupled via a port of the GPP to an application specific data path of the ASIP; and in that the ASIP includes a pre-decoder for receiving a GPP instruction set architecture (ISA) compatible instruction from the GPP via the port, the pre-decoder being arranged to translate the received GPP ISA compatible instruction to one or more instructions compatible with an ISA of the ASIP or to a start address in an instruction memory of the ASIP where the one or more ASIP ISA compatible instructions are stored, an execution unit for executing the one or more ASIP ISA compatible instructions to produce a result, and means for conveying the result to the GPP.

According to a third aspect of the invention, there is provided a computer processing apparatus including a processor arrangement in accordance with any of the five preceding paragraphs.

According to a fourth aspect of the invention, there is provided an electronic apparatus including a processor arrangement in accordance with any of the five but one preceding paragraphs.

According to a fifth aspect of the invention, there is provided a method of increasing the efficiency of execution of a software program by a general purpose processor (GPP), the method being characterized in that it comprises the steps of: providing a GPP coupled via a port of the GPP to an application specific data path of an application specific instruction set processor (ASIP); conveying a GPP instruction to a pre-decoder of the ASIP via the GPP port; in the pre-decoder, translating the received GPP instruction to a form compatible with an instruction set architecture (ISA) of the ASIP; executing in the ASIP one or more ASIP compatible instructions resulting from the translation step; and conveying a result of the execution step to the GPP; wherein the GPP instruction comprises an application specific function part of the software program being executed by the GPP and the ASIP is selected to have an application specific functionality that includes the application specific function part of the GPP software program.

According to a sixth aspect of the invention, there is provided a method of generating a software simulator interface for a processor arrangement in accordance with the invention.

According to a seventh aspect of the invention, there is provided a computer program product characterized in that it comprises code defining a software simulator interface generated by the method of the preceding paragraph.

According to an eight aspect of the invention, there is provided a method of pre-processing a user program for a processor arrangement in accordance with the invention.

BRIEF DESCRIPTION OF THE DRAWINGS

The foregoing and further features of the present invention will be more readily understood from the following description of an advantageous embodiment, by way of example only, with reference to the accompanying drawings, in which.

DESCRIPTION OF THE INVENTION

Figure 1:
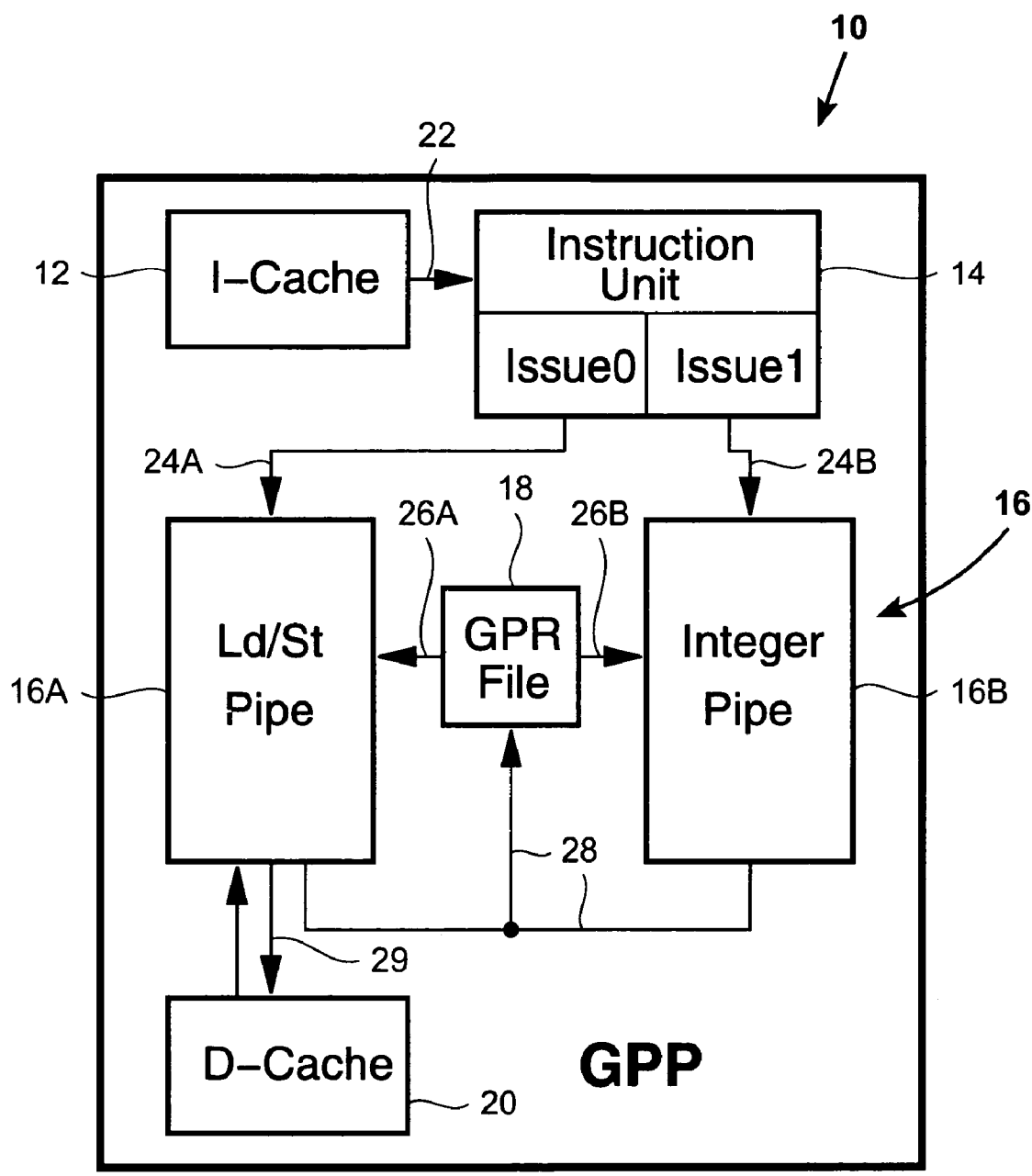
FIG. 1 is a block schematic diagram of a GPP architecture by way of example.

The present invention obviates and/or mitigates disadvantages associated with known arrangements of GPPs and ASIPs. The invention also provides a coupled GPP and ASIP which share the results of execution of an ASIP instruction.

In an example embodiment of the invention, there is provided a method of operating a general purpose processor (GPP) coupled via a port of the GPP to an application specific data path of an application specific instruction set processor (ASIP). The method includes the steps of: conveying a GPP instruction to a pre-decoder of the ASIP via the GPP port; in the pre-decoder, translating the received GPP instruction to a form compatible with an instruction set architecture (ISA) of the ASIP; executing in the ASIP one or more ASIP compatible instructions resulting from the translation step; and conveying a result of the execution step to the GPP.

The coupling of the GPP to the ASIP through a port of the GPP provides a means of efficiently and directly conveying GPP instructions to the ASIP. The provision of a pre-decoder in the ASIP to translate a received GPP instruction to a form compatible with the ISA of the ASIP enables the GPP to include in its instruction set application specific instructions that are executed in the ASIP. The result of the execution step is conveyed from the ASIP to the GPP either via the port coupling the GPP and ASIP or via a bus connecting the processors. The GPP takes advantage of the increased execution speed of the ASIP for selected application specific functions that form part of a program being executed by the GPP.

The translation step may comprise converting a GPP ISA compatible instruction to an ASIP ISA compatible instruction. This comprises one mode of interoperation of the coupled GPP and ASIP in which a GPP instruction is converted directly to operation codes of a respective application specific function to be executed in the ASIP.

Advantageously, the GPP instruction is split into an operation-request instruction and a gets-results instruction and the instructions are conveyed sequentially to the ASIP.

Advantageously, the method includes the steps of: executing an application specific program in the ASIP independently of the GPP, wherein instructions comprising the application specific program are read by an instruction unit of the ASIP from an instruction memory of the ASIP; detecting in the ASIP a GPP issue signal associated with a GPP instruction conveyed to the pre-decoder of the ASIP from the GPP; and in response to detection of the GPP issue signal, scheduling the instruction unit of the ASIP to read instructions translated from the GPP instruction from the pre-decoder.

This represents another mode of interoperation of the coupled GPP and ASIP in accordance with the invention. In this mode, the GPP and ASIP run independently of each other executing programs. However, the GPP can 'interrupt' the ASIP by use of an instruction signal accompanying a GPP instruction that is conveyed to the ASIP from the GPP via the coupling port. Detection of this signal, through polling for example, alerts the ASIP to the presence of a GPP instruction in the pre-decoder and the ASIP then proceeds to operate in accordance with the first mode of interoperation of the coupled GPP and ASIP.

An alternative translation step in the pre-decoder of the ASIP comprises converting a GPP instruction into an address in an instruction memory of the ASIP pointing to a start location of code comprising a plurality of ASIP ISA compatible instructions.

This comprises a further mode of interoperation of the coupled GPP and ASIP. In this mode of interoperation, the GPP instruction is translated in the pre-decoder to an ASIP instruction memory start address for a stored ASIP instruction set for an application specific function. Thus, the GPP, through a single instruction, can call execution in the ASIP of a complex function that would take the GPP many clock cycles to execute itself.

Advantageously, the method includes the step of combining test ports of both the GPP and the ASIP to provide a single test port for the coupled GPP/ASIP.

In another example embodiment of the invention, there is provided a processor arrangement comprising a general purpose processor (GPP) coupled to an application specific instruction set processor (ASIP), the arrangement being characterized in that: the GPP is coupled via a port of the GPP to an application specific data path of the ASIP; and in that the ASIP includes a pre-decoder for receiving a GPP instruction set architecture (ISA) compatible instruction from the GPP via the port, the pre-decoder being arranged to translate the received GPP ISA compatible instruction to one or more instructions compatible with an ISA of the ASIP or to a start address in an instruction memory of the ASIP where the one or more ASIP ISA compatible instructions are stored, an execution unit for executing the one or more ASIP ISA compatible instructions to produce a result, and means for conveying the result to the GPP.

Advantageously, the ASIP is arranged to execute an application specific program independently of the GPP, the ASIP being arranged such that instructions comprising the application specific program are read by an instruction unit of the ASIP from the instruction memory of the ASIP, and wherein the instruction unit of the ASIP is arranged to detect a GPP issue signal associated with a GPP instruction conveyed to the pre-decoder of the ASIP from the GPP, the instruction unit being arranged, in response to detection of the GPP issue signal, to read ASIP ISA compatible instructions translated from the GPP instruction from the pre-decoder.

In one advantageous arrangement, the pre-decoder comprises a look-up table including operation codes for one or more ASIP ISA compatible instructions corresponding to operation codes of GPP instructions.

Alternatively, the pre-decoder comprises a look-up table including start addresses in the instruction memory of the ASIP pointing to respective start locations of code comprising sets of ASIP ISA compatible instructions. The processor arrangement may be formed as a system-on-chip (SoC) device.

In another example embodiment of the invention, there is provided a computer processing apparatus including a processor arrangement in accordance with any of the five preceding paragraphs.

In another example embodiment of the invention, there is provided an electronic apparatus including a processor arrangement in accordance with any of the five but one preceding paragraphs.

In another example embodiment of the invention, there is provided a method of increasing the efficiency of execution of a software program by a general purpose processor (GPP), the method being characterized in that it comprises the steps of: providing a GPP coupled via a port of the GPP to an application specific data path of an application specific instruction set processor (ASIP); conveying a GPP instruction to a pre-decoder of the ASIP via the GPP port; in the pre-decoder, translating the received GPP instruction to a form compatible with an instruction set architecture (ISA) of the ASIP; executing in the ASIP one or more ASIP compatible instructions resulting from the translation step; and conveying a result of the execution step to the GPP; wherein the GPP instruction comprises an application specific function part of the software program being executed by the GPP and the ASIP is selected to have an application specific functionality that includes the application specific function part of the GPP software program.

Advantageously, the step of translating a received GPP instruction includes reading a software program for the application specific function part of the GPP software program from a library of software programs comprising programs for respective application specific function parts of the GPP program.

In another example embodiment of the invention, there is provided a method of generating a software simulator interface for a processor arrangement in accordance with the invention, the method being characterized in that it comprises the steps of: receiving a first simulator application peripheral interface (API) for the GPP; receiving a second API for the ASIP; determining interactions between the first and second API's; generating as an output events resulting from interactions of the first and second API's and events from the first and second API's that have not been subject to interaction; and implementing the output as a single user interface for the processor arrangement.

In another example embodiment of the invention, there is provided a computer program product characterized in that it comprises code defining a software simulator interface generated by the method of the preceding paragraph.

In another example embodiment of the invention, there is provided a method of pre-processing a user program for a processor arrangement in accordance with the invention, the method being characterized in that it comprises the steps of: pre-compiling the user program to create a GPP compiler file in which calls to the ASIP in the GPP part of the user program are translated into binaries and an ASIP compiler file; compiling the non-binary instructions in the GPP compiler file to create a GPP binary file; compiling the ASIP compiler file to create an ASIP binary file; and merging the GPP binary file and the ASIP binary file to create a single binary file for the processor arrangement.

Referring to the drawings, FIG. 1 is a block schematic diagram of a general purpose processor (GPP) core 10. The GPP 10 comprises an instruction cache (I-Cache) 12, an instruction unit 14, an execution unit 16 comprising two execution pipes 16A, 16B, a general purpose register (GPR) file 18 and a data cache (D-Cache) 20. The execution unit 16 comprises a load/store pipe (Ld/St Pipe) 16A and an integer pipe (Integer Pipe) 16B.

In operation, part of a software program of the GPP 10 is stored in the I-Cache 12. The instruction unit 14 fetches (denoted by arrowed line 22 in FIG. 1) from the I-Cache 12 single or multiple instructions—depending on how many instructions the GPP 10 can execute in parallel—sequentially in a known manner. The fetched instructions are then decoded in the instruction unit 14 to determine their respective operations, e.g. add, shift, load, etc and, according to their respective determined operations, the instruction unit 14 issues (denoted by the legends "Issue0" and "Issue1" and corresponding arrowed lines 24A and 24B in FIG. 1) the instructions to the corresponding execution pipes 16A, 16B. For example, all arithmetic instructions are issued to the Integer Pipe 16B whereas all memory (data cache) access instructions are issued to the Ld/St Pipe 16A.

To execute an instruction in the execution unit 16, it is necessary to load (denoted by arrowed lines 26A and 26B in FIG. 1) into the execution unit 16 the operands specified in the instruction. These are stored in registers of the GPR file 18. The GPR file 18 comprises a plurality of registers which are accessed by unique addresses. Thus, the respective execution pipes 16A, 16B of the execution unit 16 access the specific GPR registers specified in the instruction to be executed and perform the operation specified in the instruction on the stored operands found in the specified GPR registers. For example, for an "add" instruction, the add instruction specifies two GPR register addresses where the two addends are stored, whereas for a "store" instruction (operation), one GPR register specified in the store instruction includes the data to be stored and another GPR register specified in the store instruction includes the memory/cache address where the data to be stored is to be moved for storage. The result of execution of an instruction in the execution unit 16 is then either stored (denoted by arrowed lines 28 and 29 in FIG. 1) in another register of the GPR file 18 or in the D-Cache 20.

FIG. 1 is an example of a GPP core 10 which is capable of executing two instructions in parallel and which includes the caches 12, 20 to act as a buffer for a main memory (not shown). It will be appreciated by a skilled artisan that the GPP architecture depicted by FIG. 1 is provided for illustrative purposes only and that many other possible GPP architecture arrangements could be employed in the present invention.

Figure 2:
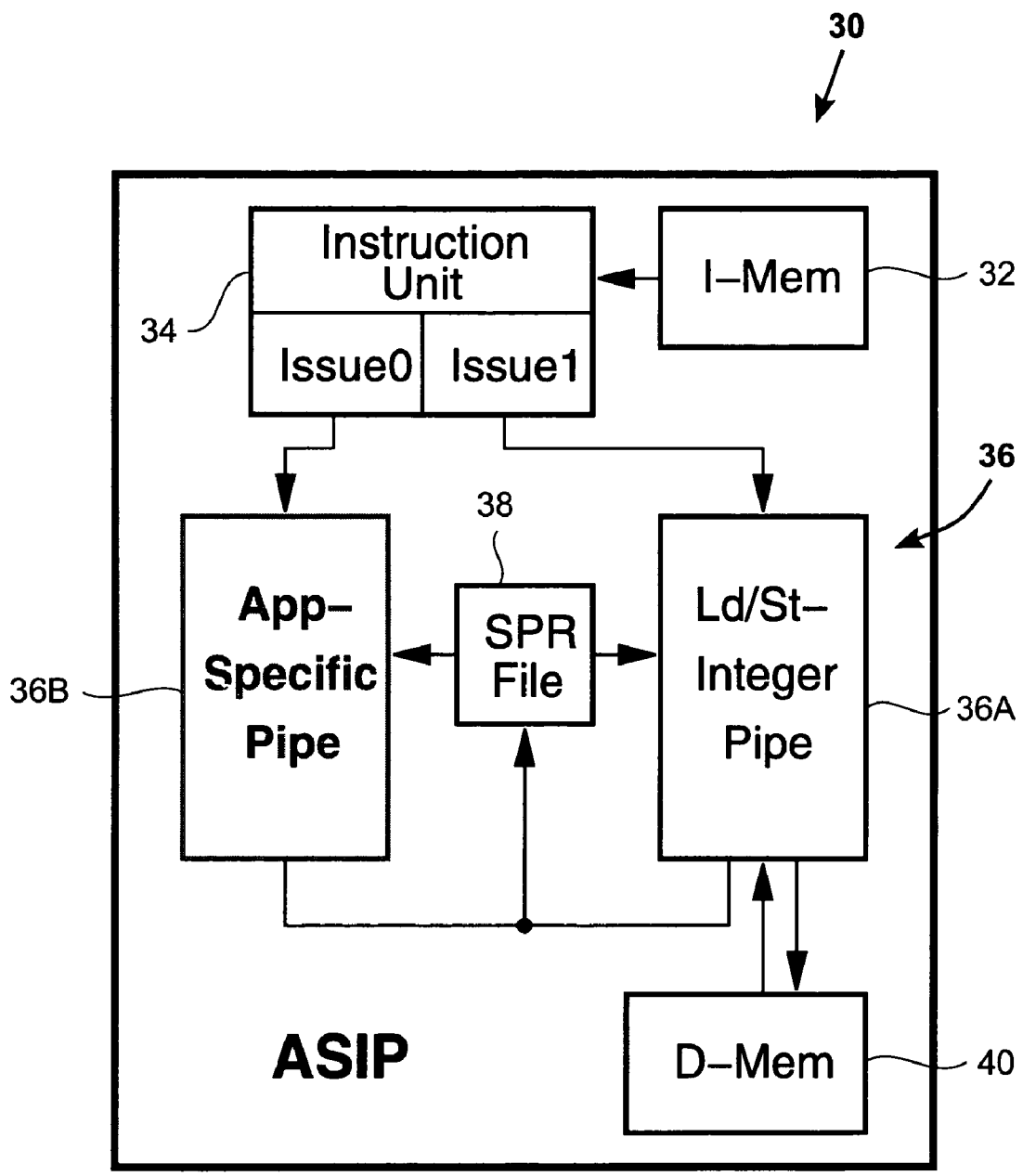
FIG. 2 is a block schematic diagram of an ASIP architecture by way of example.

Referring to FIG. 2, this shows a block schematic diagram of an ASIP core 30. This comprises a similar structure to the GPP 10 in that it comprises an instruction memory (I-Mem) 32, an instruction unit 34, an execution unit 36, a special purpose register (SPR) file 38 and a data memory (D-Mem) 40. In contrast to a GPP, the ASIP 30 usually comprises normal memory units (I-Mem 32, D-Mem 40) rather than caches and its registers are not general purpose but special purpose, being specific to the application specific operation of the ASIP 30. However, the most significant difference between the GPP 10 and the ASIP 30 is that the execution unit 36 of the ASIP 30 is application specific. The application specific execution unit 36 comprises an ASIP load/store execution pipe (Ld/St Integer Pipe) 36A and an App-Specific Pipe 36B. The ASIP 30 has a similar mode of operation to that of the GPP 10 but, whereas the execution unit 16 of the GPP 10 executes basic instructions such as add, subtract, load, store, etc, the application specific execution unit 36 of the ASIP 30 is arranged to execute much more complex functions as a result of a single instruction. In the ASIP 30, a single application specific instruction may consist of several arithmetic operations coupled with many load and store operations.

The GPP 10 is capable of executing the same function as the ASIP 30 but to do so it executes a sequence of many instructions corresponding to the basic operations comprising the function. Consequently, the ASIP 30 provides a much faster execution time of an application specific function than is achievable by the GPP 10.

Known extendable GPP architectures provide the capability of extending their basic instruction set architectures (ISAs) by tightly-coupling an additional execution unit (often also called a coprocessor, because it does not comprise a part of the original GPP core) to the GPP. A special interface of the GPP is used. The instruction unit of the GPP issues all the instructions which are unknown to it or are specially defined as coprocessor instructions (i.e. compatible with the instruction set architecture of the coprocessor) through the special interface to the coprocessor. For example, all units of a SoC design are called coprocessors except for the GPP core itself. Thus, the term "coprocessor" encompasses all data processing assists of the GPP, but it does not mean that it must comprise a programmable processor core. Furthermore the term "loosely coupled" is used if the coprocessor is via an on-chip-interconnect (e.g. a bus or a mesh) connected with the GPP, thus it is part of the address space of an interconnect system. The term "tightly coupled" is used if the coprocessor is connected via a special interface of the GPP, thus the coprocessor is addressed with opcodes of the instructions. The state of the art presently is that if the coprocessor is a programmable processor like an ASIP, it is loosely coupled to the GPP via a bus. There are presently no methods for tightly-coupling an ASIP to a GPP.

Figure 3:
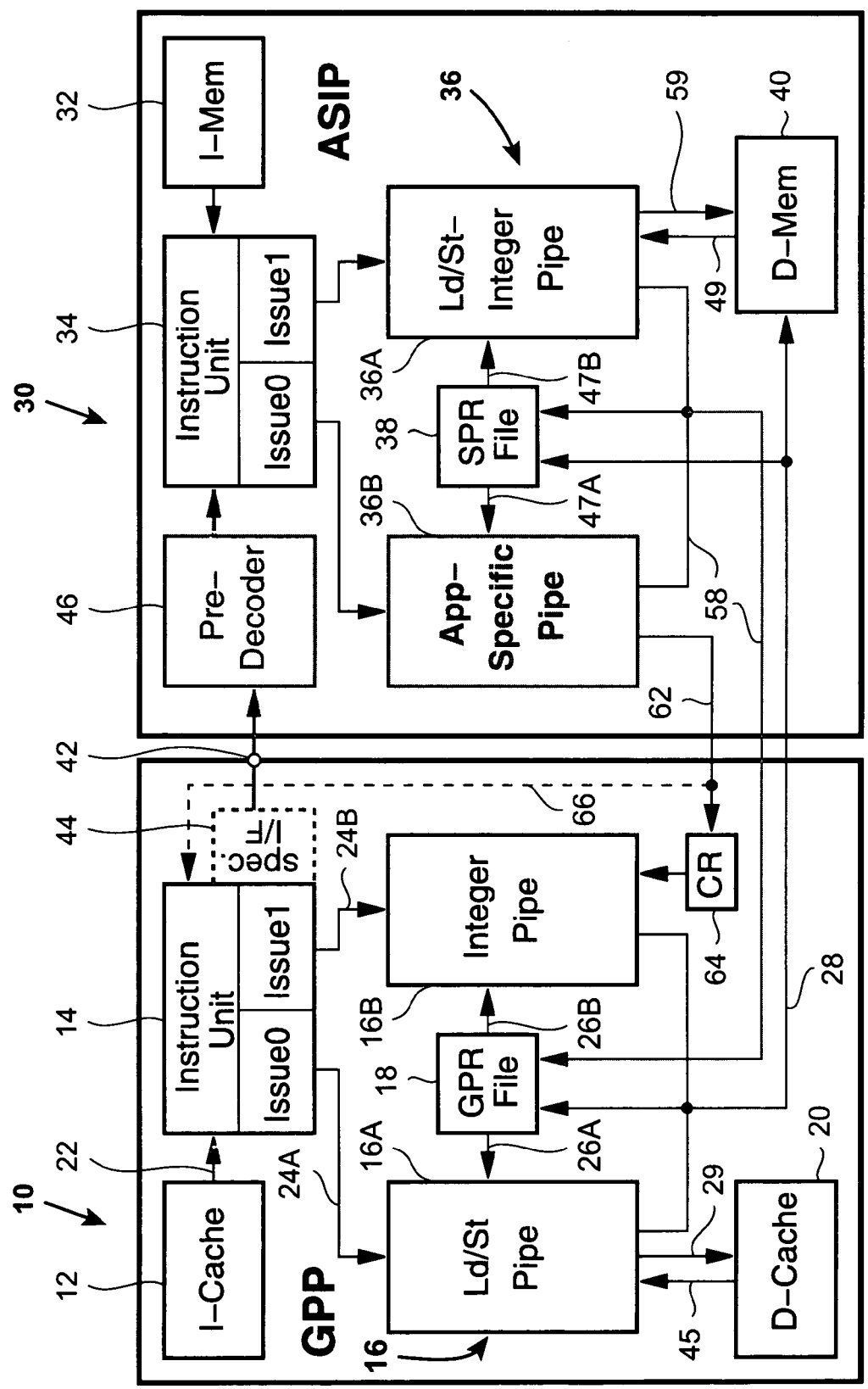
FIG. 3 is a block schematic diagram of a tightly-coupled GPP and an ASIP in accordance with the invention.

Referring now to FIG. 3, this depicts a block schematic diagram of a tightly-coupled GPP and an ASIP in accordance with the invention. In the following description of the tightly-coupled GPP and ASIP arrangement in accordance with the invention, like numerals to those employed in the descriptions of FIGS. 1 and 2 will be used to denote like or similar parts.

As illustrated in FIG. 3, the present invention comprises coupling the application specific execution unit 36 of the ASIP 30 to a port 42 of the GPP 10 in such a manner that the GPP 10 can profit from the operation of the application specific execution unit 36. The port 42 comprises a special interface (spec. I/F) 44 of the GPP 10. The connection of the spec. I/F 44 to the application specific execution unit 36 of the ASIP 30 enables the GPP 10 to execute GPP instructions that are not part of the normal ISA of the GPP 10 Thus, for example, if the ASIP 30 includes a Multiply Accumulate (MAC) unit (not shown) and the GPP 10 does not, then this interconnection between the GPP 10 and ASIP 30 will enable the GPP 10 to execute MAC instructions. This is one mode of interoperation made possible by coupling the GPP 10 to the ASIP 30 in the manner described. Another possible mode of interoperation between the GPP 10 and the ASIP 30 comprises the GPP 10 calling a whole complex function/procedure with a single instruction belonging to the GPP ISA where the function/procedure will be computed within the ASIP 30. For example, this may comprise the GPP 10 calling a whole filter algorithm computed by the ASIP 30 rather than a MAC instruction as in the first interoperating mode. In a yet further mode of interoperation made possible by the afore described coupling of the GPP 10 to the ASIP 30, the ASIP 30 runs fully independently of the GPP10 acting as a hardware assist for the GPP 10 whereby at selected synchronisation points the processors exchange data or wait on each other. An example of this mode of interoperation may comprise the ASIP 30 being programmed to run a modem application independently of the GPP 10 but on its behalf. The GPP 10 and ASIP 30 may each comprise a suitably conFigured ARM processor (ARM is a trademark of ARM Limited) or an International Business Machines (IBM) PowerPC processor (PowerPC is a trademark of IBM), for example . . . t will be appreciated that the processor arrangement of the present invention could be implemented by any combination of suitably conFigured, commercially available GPPs such as those mentioned above.

Considering the first advantageous mode of interoperation, the GPP 10 is utilising the data path of the ASIP 30 as a coupled coprocessor. Since the instruction set architecture (ISA) of a processor (e.g. the GPP) is individual to it and thus incompatible with that of another processor (e.g. the ASIP), a pre-decoder 46 (FIG. 3) is provided in the ASIP 30 in order to translate a received instruction from the GPP 10 into an instruction that the ASIP 30 understands, i.e. an instruction that is compatible with the ISA of the ASIP 30.

Figure 4:
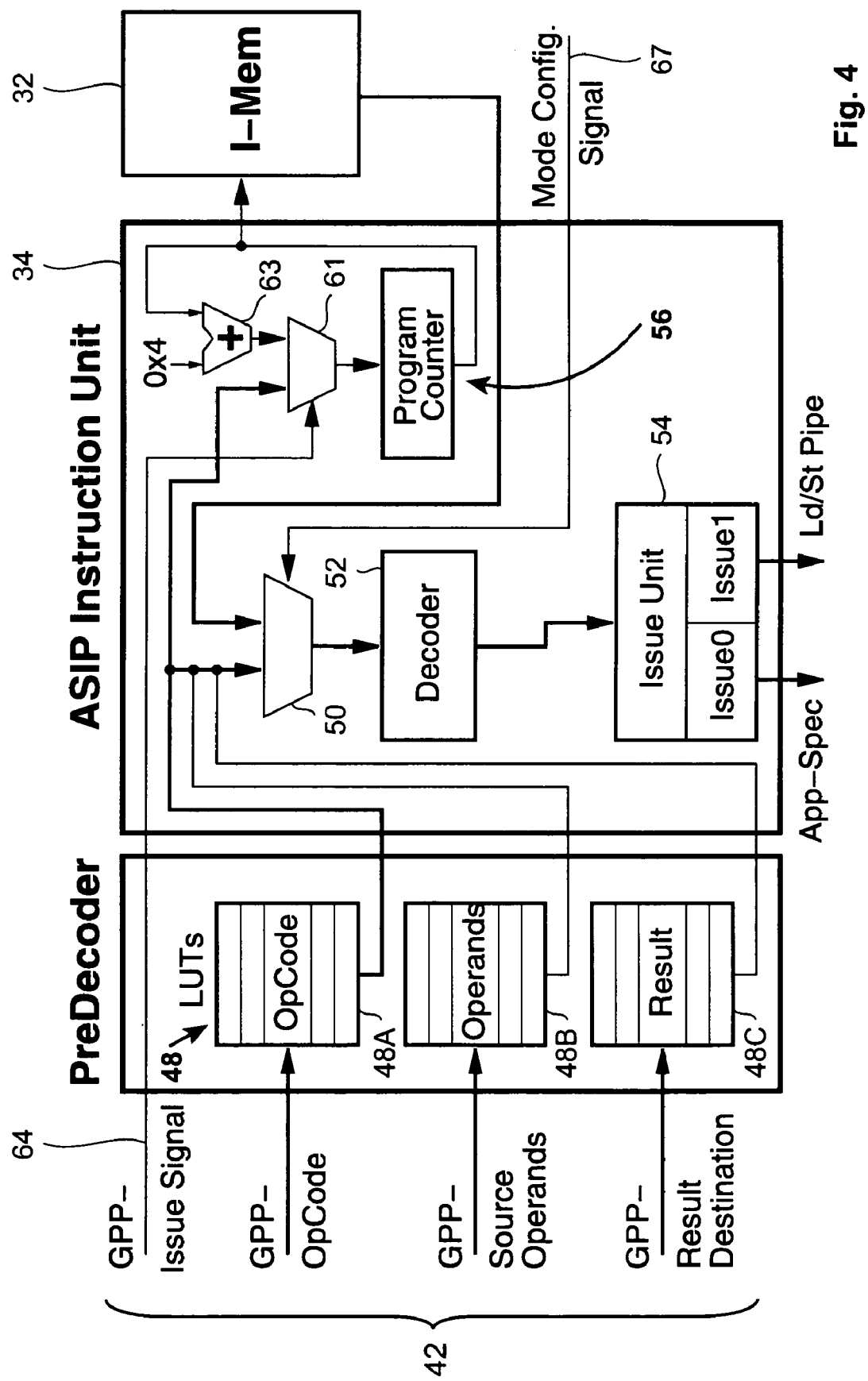
FIG. 4 is a block schematic diagram of the structures of and connections between a pre-decoder and an ASIP instruction unit of a tightly-coupled GPP/ASIP arrangement accordance with the invention.

FIG. 4 illustrates a structure of the pre-decoder 46 and its relationship with the instruction unit 34 of the ASIP 30. The pre-decoder 46 comprises a number of look-up tables (LUTs) 48 which are each outputted to a multiplexer 50 of the instruction unit 34. The instruction unit includes a decoder 52, an issue unit 54 and a program counter 56.

Figure 5:
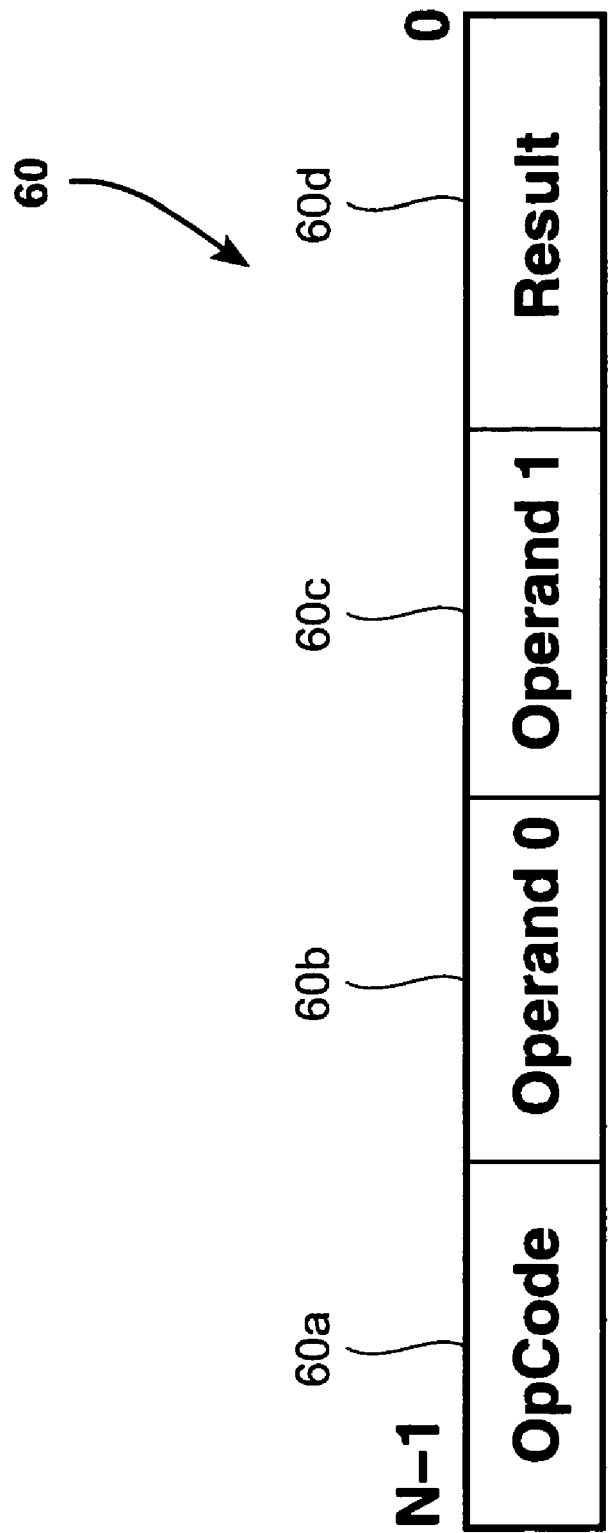
FIG. 5 is a diagrammatic representation of an instruction issued from the GPP to the ASIP in accordance with the invention.

As illustrated in FIG. 5, an instruction 60 to be issued from the GPP to the ASIP has a specific bit width N which is split into several segments 60(*a* . . . *d*). Each segment 60(*a* . . . *d*) of the instruction is called a field. Single or combinations of these fields inform the ASIP 30 which operation is to be performed, where the operands for the operation are located (stored) and where the result of the operation is to be stored. Therefore, instructions are conveyed through the spec. I/F 44 of the GPP 10 to the ASIP 30 with the following information:

1. Operation Code (OpCode) 60*a* which describes the type of operation the instruction is to execute and may include additional information like immediate operands, i.e. operands stored within the instruction itself, or conditions such as whether the operation has to be executed or whether the program has to branch into another part of the program.
2. Source Operand Pointers 60*b, c* which point to the source where the operands come from. An operand might be stored in a register such as the GPR file 18 or the SPR file 38 or at a memory address, e.g. the D-Mem 40, as illustrated by arrowed lines 45, 47A, B and 49 in FIG. 3. Thus, the source operand 60*b, c* gives the address of the register that includes the source operand or it gives the memory address where the source operand is stored.
3. Result Destination Pointers 60*d* which point to the destination where the results are to be placed. The result of an operation might be placed either into a register such as the GPR file 18 or the SPR file 38 or at a memory address. Thus, the result destination pointer 60*d* gives the address of the register where the result of the operation is to be stored or the address of the memory space where it is to be stored.

Referring again to FIG. 4, in operation, a first look-up table (LUT) 48A of the pre-decoder 46 is addressed by the OpCode field 60*a* of the instruction 60 received from the GPP 10. The output of this LUT 48A is the corresponding OpCode of the ASIP 30 and this output OpCode is passed to the multiplexer 50 of the instruction unit 34 before being conveyed to the decoder 52 which decodes the translated OpCode in a known manner to determine its operations which are issued as appropriate by the issue unit 54 to the ASIP execution pipes 36A, 36B and executed in a known manner. The pre-decoder 46 has second and third LUTs 48B, 48C for translating the source operand and result destination pointers of the respective source operand field 60(*b, c*) and result destination field 60*d* of the received instruction 60 in much the same manner.

Consequently, in this first mode of interoperation of the tightly-coupled GPP 10 and the ASIP 30, the instruction unit 34 of the ASIP 30 retrieves its corresponding instruction (OpCodes) from the pre-decoder 46 rather than from its instruction memory (I-MEM) 32 as would be the case under normal ASIP operation and issues the instruction to its application specific execution unit 36. The instruction is then executed in the ASIP 30 in a normal manner since the translated instruction is recognised as an ASIP instruction even though it has originated in the GPP 10. Consequently, the GPP 10 can execute an instruction comprising a complex function through the tightly-coupled ASIP 30 that does not form part of its normal ISA and benefit from the faster processing time offered by the ASIP 30 compared to the time it would take the GPP 10 to execute a series of GPP compatible instructions comprising the same complex function.

After the instruction has been executed in a conventional manner in the ASIP 30, the result of the execution is conveyed to the destination defined by the translated result destination pointer of the received instruction 60. The result can be stored either in a register of the GPR file 18 or the SPR file 38 or into the D-Mem 40 (as illustrated by arrowed lines 58 and 59 in FIG. 3). Simultaneously, the ASIP 30 raises a result ready flag which signals that the execution step is complete and the result is ready to be processed. The result ready flag is generated by the execution unit 36 of the ASIP 30 and conveyed via a link 62 to a condition register (CR) 64 of the GPP 10. The flag raises a bit within the CR 64 which, when polled by the execution unit 16 of the GPP 10, tests the bit against condition instructions to determine if the result ready flag has been raised yet or not. This polling of the CR 64 is not executed if the result ready flag is conveyed directly (denoted by dashed line 66 in FIG. 3) to the instruction unit 14. Thus, the next GPP instruction will only be issued once the result ready flag has been raised.

If the GPP 10 is able to execute multiple instructions at the same time (instruction-level parallelism) out of order, then the result ready flag is not detected by the instruction unit 14 via the condition register 64 but by an instruction dependency control unit (not shown). In the case where the dependency control unit is a Reordering Buffer (ROB) (not shown), then all the results of the execution units (16, 36) are first stored in the ROB and, only after the commitment of the GPP execution unit 16 that the result is valid and not dependent on an ongoing parallel execution, the ROB stores the result to the final destination, such as the memory (D-Cache 20) or the registers (18, 38). Thus for the commitment of a result within the ROB, the result ready flag 62 can be utilized. Where a register-renaming approach is employed, an extended set of physical registers (i.e. the number of registers that are actually in the GPR file 18) is used to hold both architecturally visible registers (i.e. the registers that an instruction is allowed to address) as well as temporary addresses. Thus, the extended GPR file 18 replaces the function of the ROB. During instruction issue, a renaming process maps the addresses of architectural registers to physical register addresses in the extended GPR file 18 and allocates a new unused physical register address for the result destination. A physical register holding a result does not become an architectural register accessible by an instruction until the result is committed, like in the ROB. Thus the result ready flag 62 is conveyed directly to the GPR file 18 including the renaming mechanism. These mechanisms allow GPP instructions to execute out of order but force them to commit to order and to prevent any irrevocable action until an instruction commits. In the present invention, the result ready flag 62 comprises the commitment mechanism.

The source operands and results may be stored in any of the GPR file 18, the SPR file 38 and the D-Mem 40 as aforementioned. An alternative to conveying any operand or result from the GPP 10 to the ASIP 30 or vice-versa would be to implement one or more transfer registers (not shown) in either or both of the GPP 10 and the ASIP 30. However, this alternative uses more instructions to prepare the execution of an instruction within the ASIP 30 because first the operands are placed in the transfer register and, after execution of an ASIP instruction, the result is fetched from the transfer register. A further alternative would be to provide a specific shared memory space (not shown) which would operate in a like manner to the transfer register. However, this alternative has the same disadvantage as that of the transfer register and a further disadvantage of the large latencies that are encountered with memory devices.

If the sources and destinations defined by the source operand and result destination pointers are located in the GPR file 18 of the GPP10, it is advantageously that an instruction 60 is split into an operation-request instruction followed by a get-results instruction. As a result, the GPP 10 need not be held during execution of the whole instruction or if the requested result is not yet available.

Referring now to a second advantageous mode of interoperation of the tightly-coupled GPP 10 and ASIP 30, in this mode the pre-decoder 46 operates like an interrupt vector table of the ASIP 30. The difference to the first mode of interoperation is that a received instruction 60 is not translated to a corresponding ASIP instruction through the pre-decoder LUTs 48 but as a multi clock cycle "instruction" through a GPP OpCode to ASIP address translation process. The new "instruction" consists of several ASIP "instructions" which may comprise a complex function such as a filter algorithm, for example. The OpCode field 60a of the received instruction 60 is translated, through the first LUT 48A, into a start address which points to the start address where the code of an ASIP function/procedure is stored in the ASIP instruction memory (I-MEM) 32.

In this mode of interoperation, the OpCode LUT 48A is not conFigured with corresponding ASIP OpCodes as in the first mode of interoperation but is conFigured with start memory addresses pointing to addresses in the I-Mem 32 where the ASIP OpCodes for called functions are stored. Therefore a mode configuration input signal (Mode Config. Signal) 67 (FIG. 4) which controls the multiplexer 50 of the ASIP instruction unit 34 is set such that the multiplexer 50 ensures that the decoder 52 retrieves instructions to be executed in the execution unit 36 from the I-Mem 32 rather than from the OpCode LUT 48A as in the first mode of interoperation. The Mode Config. Signal 67 might originate from a configuration unit (not shown) of the coupled GPP/ASIP arrangement, i.e. this unit includes all system relevant configuration registers of the GPP/ASIP arrangement, or the signal 67 might originate from a configuration register of the GPP or ASIP itself.

When an instruction 60 is received from the GPP 10 in the ASIP 30, a GPP issue signal 64 (FIG. 4) received with the instruction 60 indicates to the ASIP 30 that the instruction 60 is one which originated in the GPP 10. The GPP issue signal 64 is utilised in this mode of interoperation to cause the program counter 56 to be loaded with the first translated OpCode address (start address) from the OpCode LUT 48A. The program counter 56 having been initialised in this manner operates in a normal manner to sequentially read OpCodes from addresses in the I-Mem 32 starting at the start address. The program counter 56 includes a multiplexer 61 for multiplexing input signals to the program counter 56 and a first summing unit 63 for incrementing a program count as each I-Mem address is read. Thus, the instruction unit 36 of the ASIP 30 reads from the I-MEM 32 the function/procedure OpCode comprising the series of "instructions" comprising the function/procedure until the reading process is stopped.

Figure 6:
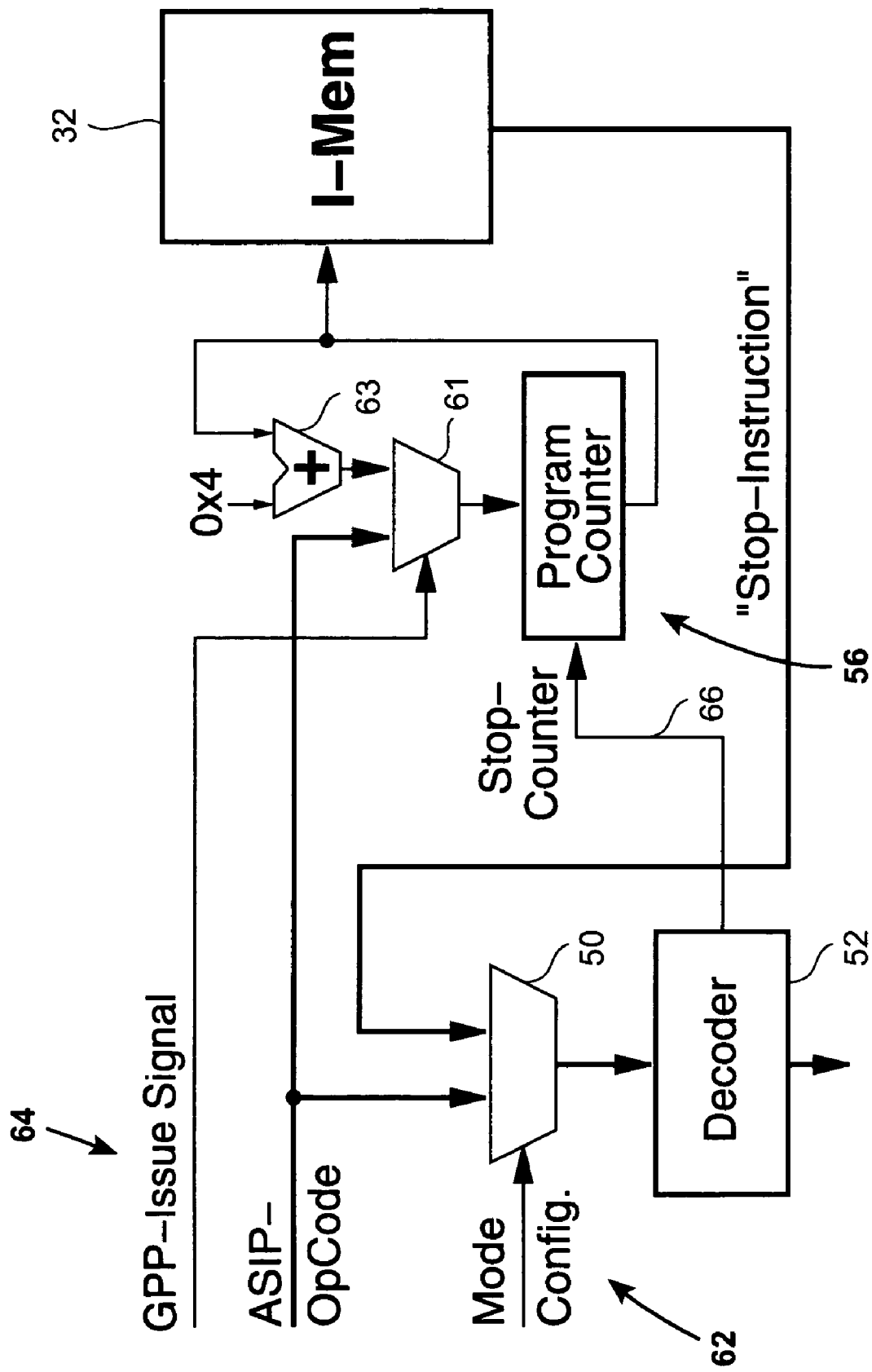
FIG. 6 is a block schematic diagram of a program counter of a tightly-coupled GPP/ASIP arrangement in accordance with the invention illustrating a first method of controlling a program reading process.

The ASIP OpCode reading process can be controlled to stop in different ways. A first way of stopping the reading process is by specifying an ASIP stop instruction that is recognised by the decoder 52 as being a stop reading instruction. This process is illustrated by FIG. 6, wherein the ASIP ISA programmer sets a stop instruction at the last address of the set of I-Mem addresses storing the OpCode of the called function. When this instruction is read from the last address and is passed to the decoder 52 via the multiplexer 50, the decoder 52 recognises the stop instruction and issues a stop counter signal (denoted by arrowed line 66 in FIG. 6) to the program counter 56. Receipt of the stop counter signal 66 from the decoder 52 causes the program counter 56 to end the sequential reading of the contents of addresses of the I-Mem 32. The program counter is held at the current program count until such time as the GPP 10 issues a new "multi-cycle" instruction 60 calling for execution of a complex function in the ASIP 30.

Figure 7:
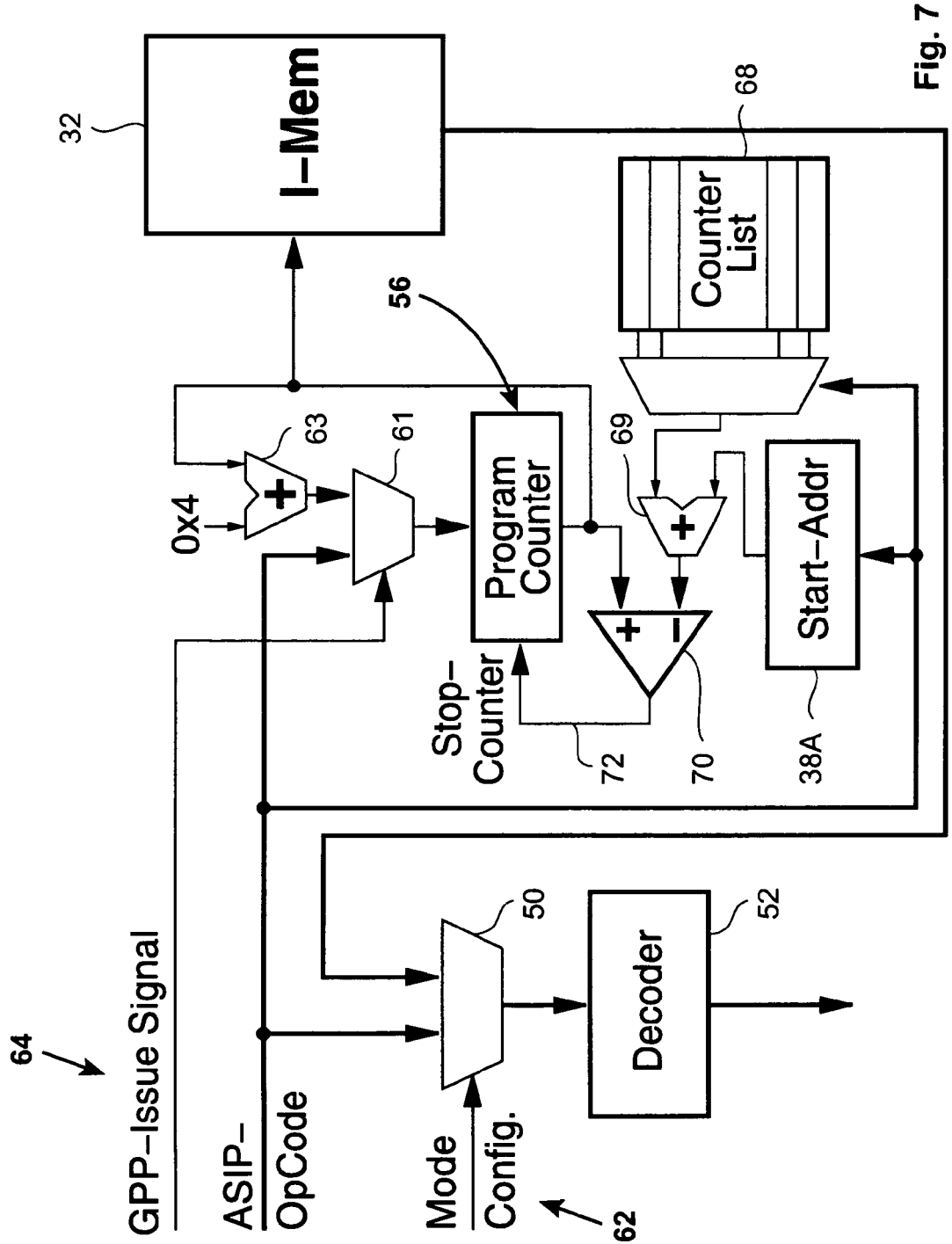
FIG. 7 is a block schematic diagram of a program counter of a tightly-coupled GPP/ASIP arrangement in accordance with the invention illustrating a second method of controlling a program reading process.

A second method of controlling the reading of the I-Mem 32 comprises counting the number of read instructions. This method of stopping the reading process is illustrated in FIG. 7. In this case, the ASIP ISA programmer must configure a counter list unit 68 within the ASIP instruction unit 34. Entries in the counter list unit 68 include the number of instructions (I-Mem addresses) respective "multi-cycle" instructions (functions) consist of. The value of the start address of the called function translated from the OpCode field 60a of a received instruction 60 is stored in a register 38A (FIG. 7) of the SPR file 38. The value of the counter list entry for the called function is summed with the value of the start address stored in the register 38A by a second summing unit 69 of the program counter 56. As the program counter 56 reads the ASIP Opcode instructions from the I-Mem 32 starting at the start address translated from the OpCode field 60a of the received instruction 60 from the GPP 10, the output of the second summing unit 69 is compared with the actual program counter value in a comparison unit 70 (FIG. 7). This comparison step is repeated until the actual program counter value is the same as the sum outputted by the second summing unit 69 at which point the comparison unit 70 issues a stop counter signal (denoted by arrowed line 72 in FIG. 7) and the program counter 56 is stopped. The program counter is held at the current program count until such time as the GPP 10 issues a new "multi-cycle" instruction 60 calling for execution of a complex function in the ASIP 30. A variant of this method is that the counter value of the "multi-cycle" instruction is not stored within the counter list unit 68 but in a register (GPR or SPR). The source operand pointer of the "multi-cycle" instruction 60 then points to the location of the counter value and this is then summed with the value of the start address.

Figure 8:
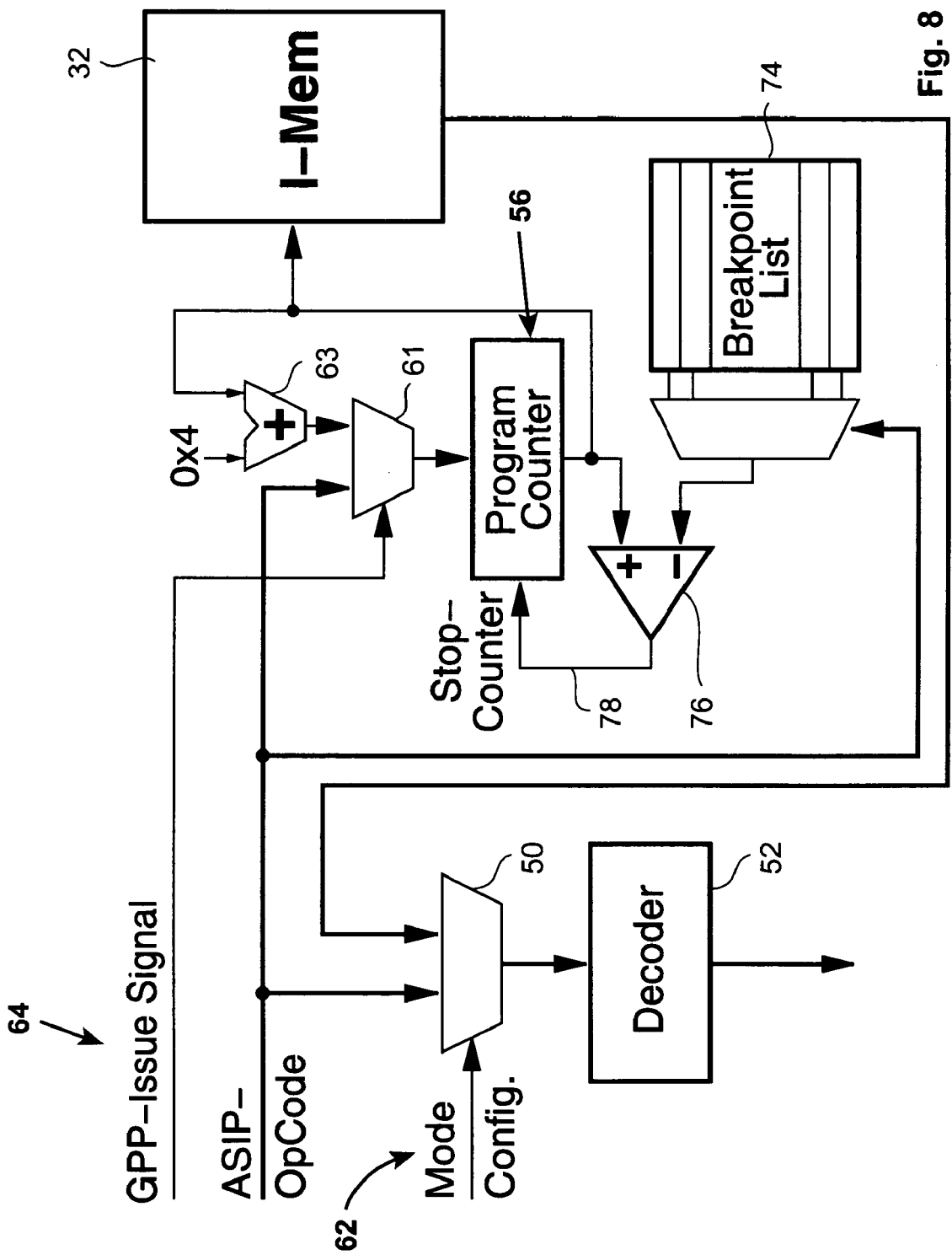
FIG. 8 is a block schematic diagram of a program counter of a tightly-coupled GPP/ASIP arrangement in accordance with the invention illustrating a third method of controlling a program reading process.

A third method of controlling the I-Mem reading process comprises setting a breakpoint at a specific instruction address. This is illustrated by FIG. 8. In this case, the ASIP ISA programmer has to conFigure a breakpoint list unit 74 within the ASIP instruction unit 34. The entries of the breakpoint list unit 74 comprise the I-Mem addresses of the ends of respective stored ASIP function OpCode sequences. As the program counter 56 reads the ASIP Opcodes for a called function from the I-Mem 32 starting at the start address translated from the OpCode field 60a of the received instruction 60 from the GPP 10, an end address value outputted by the breakpoint list unit 74 is compared with the actual program counter value in a comparison unit 76 (FIG. 8). This comparison step is repeated until the actual program counter value is the same as the end address value outputted by the breakpoint list unit 74 at which point the comparison unit 76 issues a stop counter signal (denoted by arrowed line 78 in FIG. 8) and the program counter 56 is stopped. The program counter is held at the current program count until such time as the GPP 10 issues a new "multi-cycle" instruction 60 calling for execution of a complex function in the ASIP 30. A variant of this method is that the breakpoint address of the "multi-cycle" instruction is not stored within the breakpoint list unit 74 but in a register (GPR or SPR). The source operand pointer of the "multi-cycle" instruction then points to the location of the breakpoint value and this is then compared with the actual program counter value in the comparison unit 76.

The exchange of operands and results in the second mode of interoperation as afore described can be performed in two ways, namely by identifying the location (register/memory address) for the operands and results in accordance with a predefined convention or by means of LUTs as already discussed.

In the first of these alternatives for retrieving operands and storing results, there is no requirement to translate source operand pointers (60b, c) or result destination pointers (60d) since the specific register addresses for operands and specific memory addresses for storing results are defined by convention and thus reserved for this purpose. The called function knows statically that the operands for executing the called function are stored at the predefined register addresses and that the results of execution of the function are to be stored at the predefined memory addresses. Thus, software running on the GPP 10 and waiting for the results of execution of a called function in the ASIP 30 already knows where the result will be stored by convention and does not have to be conFigured first.

Figure 9:
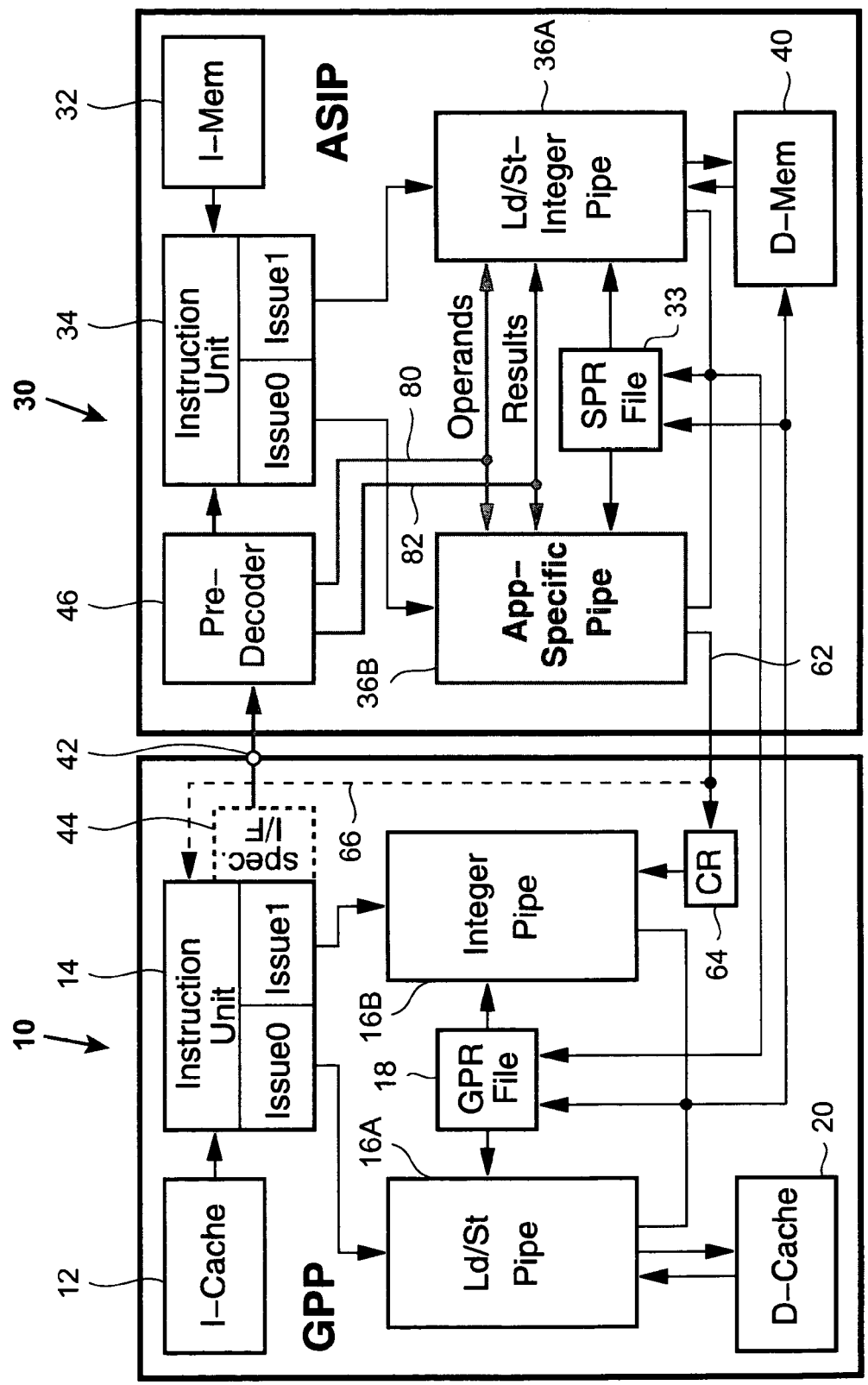
FIG. 9 is a block schematic diagram of a tightly-coupled GPP and an ASIP in accordance with the invention illustrating an alternative mode of conveying operand and result destination addresses to the execution pipes.

In the second case the operand and results LUTs 48B, 48C of the pre-decoder 46 translate the source operand pointer 60c, d and the results destination pointer 60d as aforesaid. However, in this case, as illustrated in FIG. 9 (and denoted by arrowed lines 80 and 82) the results of the translations are offered directly to the execution pipes 36A, 36B of the ASIP execution unit 36. Thus, the execution unit 36 of the ASIP 30 has direct access to the outputs of the LUTs 48 which point to the specific place where the operands are stored and point to where the results are to be stored. The addresses identified by the operand and source destination pointers may be different for each called function. The advantage of this direct coupling is that the programmer/compiler has more freedom of action. For example, if the register address X is defined by convention that it always includes the first operand of a function, but this register X is already used for some other operation, then the value of this register has firstly to be moved to the memory and, after the function has executed, to be replaced again with the value from the memory. However, with direct coupling, the programmer/compiler just chooses another register, e.g. Y, to include the first operand.

During execution of the function/procedure by the ASIP 30, the GPP 10 runs concurrently with the ASIP 30. Once the function/procedure has been executed, the ASIP 10 raises a flag which signals that the results are ready. This flag may be the same as the stop signal flag for the ASIP function as already described herein, but it may be desirable that an ASIP instruction can raise this flag. The GPP may include a flag polling routine whereby it polls the ASIP to detect existence of the end function/procedure execution flag as a means of determining whether the results are available from the ASIP. If the GPP 10 tests the status of the flag frequently with a test instruction then this constitutes polling. Such a mechanism is programmed by the programmer as a loop function. The raising of the flag may trigger an interrupt of the GPP 10 which will then execute a specific interrupt routine. Each interrupt forces the GPP 10 to execute part of its software program out of sequence. The branch of this interrupt routine is executed by the hardware itself and not by an instruction. Thus such an interrupt routine could be provided to address reading the ASIP result flag without the need for polling since the hardware automatically calls the right routine.

If, during execution of a function/procedure by the ASIP 30 in response to a received instruction 60 from the GPP 10, the GPP 10 issues a further instruction for a new function/procedure execution process, the GPP 10 is held and the pre-decoder 46 forces the ASIP 30 to branch to the specific address translated from the further GPP instruction only once the previous function/procedure has been executed. The GPP 10 is not able to issue the new instruction until the previous function/procedure has been executed and therefore it automatically stops reading any further instructions. In the absence of an instruction queue from the ASIP 30, the GPP 10 can issue the new instruction nevertheless.

Referring to the third advantageous interoperating mode, the system essentially consists of two independent processors coupled via the spec. I/F 44 which each run their own programs whilst sharing some registers and memory. Data can be passed between the processors over the spec. I/F interface rather than via a bus. The third mode of interoperation differs from the first mode only in that the ASIP 30, unlike in the first interoperation mode, runs it own independent program, but the GPP 10 is still able to issue instructions 60 to the ASIP 10 as in the first mode of interoperation. Thus the instruction unit 34 of the ASIP 30 must have the capability to dynamically schedule its instruction source, either its own I-Mem 32 or the PreDecoder 46. Thus, in this mode of interoperation, the instruction unit 34 of the ASIP 30 has to schedule between the pre-decoder 46 and the I-Mem 32 to fetch instructions to be issued to the execution pipes 36a, 36B. To do so, it checks whether the GPP issue signal 64 is set or not. If the GPP signal 64 is set then the ASIP 30 is operating in accordance with the first mode of interoperation and the execution of the I-Mem instruction in accordance with the third mode of interoperation is set back one ASIP clock cycle.

ASIP vendors already offer automatically generated simulators for their products. But for the user it is cumbersome to verify its software with two different simulators, one for the GPP and one for the ASIP. For the simulation of the coupled GPP/ASIP arrangement in accordance with the invention, a simulator would be advantageous that simulates the combination as a whole. The invention therefore also extends to a software-wrapper for both simulators, which allows the customer the use of both simulators over a single user interface. Thus the customer has the impression of using a single software instead of two. A method for generating a simulator interface for the GPP coupled to the ASIP in accordance with the invention encompasses the steps of receiving a first simulator application peripheral interface (API) for the GPP and a second simulator API for the ASIP, a step of determining the interactions between the two API's, and generating as an output the resulting events of the interactions and the events from the two API's that have not been subject to interaction. Within the determination step, a step of providing a synchronization of the timebase of the two API's and a step of translating the events of one of the two API's into a language that is compatible with the events of the other API can be provided. The output is a graphical user interface that performs the function of a co-simulator.

The invention also extends to a method of providing a compiler for the coupled GPP/ASIP arrangement in accordance with the invention. This comprises integrating a call for the ASIP compiler (provided by the ASIP vendor) into the GPP compiler. This call causes the ASIP compiler to automatically translate a part of the code for the ASIP, without any interaction of user. The coprocessor call might be also be automatically adopted.

This method would comprise a pre-compiling step that processes the user program for the GPP and the ASIP and translates ASIP calls in the GPP part into binaries. The pre-compiling step results in two files, one for a GPP compiler and one for an ASIP compiler. A next step is a first compiling step wherein the GPP compiler processes the GPP part of the user program. In this step the GPP compiler will only compile the non-binary instructions, such that the binaries resulting from the pre-compiling step remain unchanged. The output of the first compiling step is a GPP binary file. The pre-compiling step hence introduces the advantage that the GPP compiler does not encounter instructions that it cannot interpret. In a second compiling step, the ASIP compiler translates its file into an ASIP binary file. The binary files will thereafter, in a merging step, be merged into a single binary output file for the GPP coupled to the ASIP in accordance with the invention. This file can be preprocessed and offered for the most frequently used combinations of GPP and ASIP. The invention hence also extends to a binary file for a GPP coupled to an ASIP in accordance with the invention that has been created by the above described method.

The invention also extends to a debugging tool for the coupled GPP/ASIP arrangement in accordance with the invention. This tool could be a combination of the debugging software and hardware of both processors into one. For example, if the ASIP also includes the JTAG ICE (standard test port of IEEE 1149.1—In Circuit Emulation), both ports could be combined to a single one. The tool would comprise a software interface that accepts the JTAGs of the GPP and of the ASIP and provides a single user interface. This tool can also comprise an address translator that translates the scan chain address space of the test port of one of the two coupled processors to not overlap the scan chain address space of the other processor. An alternative would be for the processor arrangement to comprise a single test access port controller for both processors.

In addition the invention extends to a performance evaluation tool which allows the increase of performance achieved by the combination of GPP coupled to the ASIP in accordance with the invention to be measured.

Additionally, the invention extends to the provision of a design method comprising the steps of receiving as an input a first item descriptive of the functionality of the GPP, a second item descriptive of the functionality of the ASIP, and consolidating the two items to a resulting single item descriptive of the functionality of the GPP coupled to the ASIP in accordance with the invention. The first and second item can for example be a softcore or vhdl file or a hardcore/circuit design or set of lithographical masks for the corresponding processor. The consolidated item can be assembled from a set of (compliant) macros for a logic library, which allow a customer to tightly couple a specific ASIP to a GPP.

The invention further extends to a method of accelerating execution of a part of a software program. Such a method would comprise selecting an ASIP that is instrumental to provide an accelerated execution of the program part, combining it with a predetermined GPP, producing the software for the program part (e.g. as a library). The selection step could use as additional selection criteria input parameters like the advantageous mode, performance requirement, power consumption, price, application, etc of the ASIP.

The coupled processor arrangement according to the invention can be provided as a computer processing platform on a single chip (system on a chip) solution for predetermined applications such as digital audio, digital video, emulation, imaging and graphics, packet processing, personal digital assistant devices (PDAs), printers, wireless communication devices, for example. The platform would consist of a GPP, an ASIP with application-specific instructions and a software library for different functions of the ASIP.

In summary, the present invention concerns a method of coupling a general purpose processor (GPP) to an application specific instruction set processor (ASIP) in such a manner that the GPP can include execute instructions that do not normally comprise part of its instruction set architecture (ISA). The GPP is coupled to the ASIP via a coprocessor port such that instructions issued by the GPP to the port are conveyed to a novel pre-decoder module of the ASIP. The pre-decoder module translates the GPP instruction into operation codes for ASIP instructions to be executed in the ASIP or to an address in the ASIP instruction memory that identifies a start address for a plurality of ASIP instructions defining a complex application specific function. Once the ASIP has executed the instructions it shares the result of the execution with the GPP. In this way, the GPP takes advantage of the ASIP in its ability to more quickly execute an application specific program/procedure.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising operating a general purpose processor (GPP) coupled via a port of the GPP to an application specific data path of an application specific instruction set processor (ASIP), the step of operating taking place in-between execution pipelines of the GPP and ASIP processors and comprising the steps of:
   conveying a reserved instruction read by the GPP to a pre-decoder of said ASIP via said GPP port, said reserved instruction being an instruction read from an instruction stream of the GPP, wherein said GPP port comprises an auxiliary coprocessor unit port of said GPP;
   in said pre-decoder, translating said received GPP reserved instruction to a form compatible with an instruction set architecture (ISA) of said ASIP;
   storing in said ASIP at least one ASIP compatible instruction for execution; and at, least one step taken from. a group of steps comprising:
   executing an application specific program in said ASIP independently of said GPP, wherein instructions comprising said application specific program are read by an instruction unit of the ASIP from an instruction memory of the ASIP;
   detecting in said ASIP a GPP issue signal associated with the reserved GPP instruction conveyed to the pre-decoder of said ASIP from the GPP;
   in response to detection of said GPP issue signal, scheduling the instruction unit of the ASIP to read instructions translated from the GPP reserved instruction from the pre-decoder;
   delaying execution of ASIP instructions read from the ASIP instruction memory by one ASIP clock cycle;
   the step of the ASIP generating a flag signifying that execution of the ASIP ISA compatible instruction has been completed and conveying said flag to the GPP; the step of holding the GPP to prevent it issuing further instructions until the flag signifying that execution of the ASIP ISA compatible instruction has been completed is received by the GPP; and
   the step of combining test ports of both the GPP and the ASIP to provide a single test port for the coupled GPP/ASIP.

2. A method as claimed in claim 1, further comprising:
   executing in said ASIP at least one ASIP compatible instruction resulting from said translation step; and
   conveying a result of said execution step to said GPP, wherein said translation step comprises converting a GPP ISA reserved instruction to an ASIP ISA compatible instruction, and wherein said step of converting a GPP ISA reserved instruction to an ASIP ISA compatible instruction comprises accessing a lookup table in said pre-decoder.

3. A method as claimed in claim 2, wherein said GPP ISA reserved instruction is split into an operation-request instruction and a gets-results instruction and said operation-request instruction and a gets-results instruction are conveyed sequentially to said ASIP.

4. A method as claimed in claim 1, wherein said translation step comprises converting a GPP ISA reserved instruction into an address in an instruction memory of the ASIP pointing to a start location of code comprising a plurality of ASIP ISA compatible instructions, and said plurality of ASIP compatible instructions comprise an ASIP programmed function/procedure.

5. A processor arrangement comprising a general purpose processor (GPP) coupled to an application specific instruction set processor (ASIP), the arrangement being:
   said GPP is coupled via a port of the GPP to an application specific data path of the ASIP; and the ASIP includes a pre-decoder for receiving a GPP instruction set architecture (ISA) reserved instruction from said GPP via said port, the pre-decoder being arranged to translate said received GPP ISA reserved instruction to at least one instruction compatible with an ISA of said ASIP or to a start address in an instruction memory of the ASIP where said at least one ASIP ISA compatible instruction is stored for execution of at least one ASIP ISA compatible instruction;
   wherein the ASIP is arranged to execute an application specific program independently of the (GPP, the ASIP being arranged such that instructions comprising said application specific program are read by an instruction unit of the ASIP from the instruction memory of the ASIP, and wherein the instruction unit of the ASIP is arranged to detect a GPP issue signal associated with the GPP reserved instruction conveyed to the pre-decoder of said ASIP from the GPP, the instruction unit being arranged, in response to detection of said GPP issue signal, to read ASIP ISA compatible instructions translated from the GPP reserved instruction from the pre-decoder.

6. A processor arrangement as claimed in claim 5, further comprising an execution unit for executing the at least one SIP ISA compatible instructions to produce a result, and means for conveying the result to the GPP, wherein the GPP port comprises an auxiliary coprocessor unit port of said GPP.

7. A processor arrangement as claimed in claim 5, wherein the pre-decoder comprises a lookup table including operation codes for at least one ASIP ISA compatible instructions corresponding to operation codes of GPP ISA reserved instructions.

8. A processor arrangement as claimed in claim 5, wherein the instruction unit of the ASIP is arranged to delay by one ASIP clock cycle execution of ASIP instructions read from the ASIP instruction memory.

9. A processor arrangement as claimed in claim 5, wherein the pre-decoder comprises a lookup table including start addresses in the instruction memory of the ASIP pointing to respective start locations of code comprising respective ASIP application specific functions/programs.

10. A processor arrangement as claimed in claim 8, wherein/said sets of ASIP ISA compatible instructions comprise respective ASIP application specific functions/programs.

11. A processor arrangement as claimed in claim 5, further comprising a limitation taken from a group of limitations consisting of:
   wherein the ASIP execution unit is arranged to generate a flag signifying that execution of the ASIP ISA compatible instruction has been completed and includes means for conveying said flag to the GPP;
   being a system-on-chip device;
   being a computer processing apparatus;
   being at least one of a mainframe computer, a server, a router, a personal computer, a notepad, a mobile communication device, and a processing device;
   being an electronic apparatus; and
   being an electronic apparatus comprising at least one of: an audio processing device, a video processing device, an imaging processing device, a graphics processing device, and a printing device.

12. A method of preprocessing a user program for a processor arrangement as claimed in claim 5, the method further comprising:
   pre-compiling said user program to create a GPP compiler file in which calls to the ASIP in the GPP part of the user program are translated into binaries and an ASIP compiler file;
   compiling the ASIP compiler file to create an ASIP binary file; and
   merging the GPP binary file and the AS1P binary file to create a single binary file for the processor arrangement.

13. A non-transitory program storage device readable by machine, tangibly embodying a program of instructions executable by the machine to perform method steps for preprocessing a user program for a processor arrangement, said method steps comprising the method steps of claim 12.

14. A method of increasing efficiency of execution of a software program by a general purpose computer (GPP), comprising the steps of:
   providing a GPP coupled via a port of the GPP to an application specific data path of an application specific instruction set processor (ASIP);
   conveying a reserved instruction read by GPP to a pre-decoder of said ASIP via said GPP port;
   in said pre-decoder, translating said received GPP reserved instruction to a form compatible with an instruction set architecture (ISA) of said ASIP;
   storing for execution in said ASIP at least one ASIP compatible instruction resulting from said translation step;
   wherein the ASIP is arranged to execute an application specific program independently of the GPP, the ASIP being arranged such that instructions comprising said application specific program are read by an instruction unit of the ASIP from the instruction memory of the ASIP, and wherein the instruction unit of the ASIP is arranged to detect a GPP issue signal associated with the GPP reserved instruction conveyed to the pre-decoder of said ASIP from the GPP, the instruction unit being arranged, in response to detection of said GPP issue signal, to read ASIP ISA compatible instructions translated from the GRP reserved instruction from the pre-decoder.

15. A method as claimed in claim 14, further comprising:
   executing in said ASIP at least one ASIP compatible instruction resulting from said translation step; and
   conveying a result of said execution step to said GPP;
   wherein said GPP reserved instruction comprises an application specific function part of the software program being executed by the GPP and said ASIP is selected to have an application specific functionality that includes said application specific function part of the GPP software program, and wherein the step of translating the received GPP reserved instruction includes reading a software program for said application specific function part of the GPP software program from a library of software programs comprising programs for respective application specific function parts of said GPP program.

16. A method of generating a software simulator interface for a processor arrangement, the processor arrangement comprising a general purpose processor (GPP) coupled to an application specific instruction set processor (ASIP), the arrangement being the GPP coupled via a port of the GPP to an application specific data path of the ASIP, and the ASIP includes a pre-decoder for receiving a GPP instruction set architecture (ISA) reserved instruction from said GPP via said port, the pre-decoder being arranged to translate said received GPP ISA reserved instruction to at least one instruction compatible with an ISA of said ASIP or to a start address in an instruction memory of the ASIP where said at least one ASIP ISA compatible instruction is stored for execution of at least one ASIP ISA compatible instruction, wherein the method comprises:
   receiving a first simulator application peripheral interface (API) for the GPP;
   receiving a second API for the ASIP;
   determining interactions between the first and second API's;
   generating as an output events resulting from interactions of the first and second API's and events from the first and second API's that have not been subject to interaction; and
   implementing said output as a single user interface for the processor arrangement.

17. A method as claimed in claim 16, further comprising the steps of synchronizing time-bases of the first and second API's and translating the events of one of the first and second API's into a language that is compatible with the events of the other API.

18. A computer program product comprising code defining a software simulator interface generated by the method as claimed in claim 16.

* * * * *